US007572858B2

(12) United States Patent
Wang et al.

(10) Patent No.: US 7,572,858 B2
(45) Date of Patent: Aug. 11, 2009

(54) PROCESS FOR THE PREPARATION OF A THERMOPLASTIC ELASTOMER COMPRISING A PARTIALLY VULCANIZED RUBBER CONCENTRATE

(75) Inventors: Yundong Wang, Lancaster, MA (US); Ryszard Brozoskowski, Acton, MA (US)

(73) Assignee: DSM IP Assets B.V., Heerlen (NL)

( * ) Notice: Subject to any disclaimer, the term of this patent is extended or adjusted under 35 U.S.C. 154(b) by 242 days.

(21) Appl. No.: 10/501,902

(22) PCT Filed: Jan. 28, 2003

(86) PCT No.: PCT/NL03/00057

§ 371 (c)(1),
(2), (4) Date: Jul. 20, 2004

(87) PCT Pub. No.: WO03/064523

PCT Pub. Date: Aug. 7, 2003

(65) Prior Publication Data

US 2005/0043484 A1    Feb. 24, 2005

(51) Int. Cl.
*C08L 23/00* (2006.01)
*C08L 23/04* (2006.01)
*C08L 23/10* (2006.01)
*C08L 23/16* (2006.01)
*C08L 25/02* (2006.01)
*C08L 33/18* (2006.01)
*C08L 33/20* (2006.01)
*C08L 35/00* (2006.01)

(52) U.S. Cl. .................. 525/191; 525/207; 525/238; 525/240; 525/241

(58) Field of Classification Search ............... 525/191, 525/207, 238, 240, 241
See application file for complete search history.

(56) References Cited

U.S. PATENT DOCUMENTS

| 3,862,106 | A | * | 1/1975 | Fischer ..................... 526/348 |
| 4,220,579 | A | * | 9/1980 | Rinehart .................... 524/525 |
| 4,873,288 | A | * | 10/1989 | Komatsu et al. ............ 525/194 |
| 5,066,700 | A | | 11/1991 | Braga |
| 5,081,179 | A | * | 1/1992 | Sezaki et al. ............... 524/526 |
| 5,187,224 | A | * | 2/1993 | Hamanaka et al. .......... 524/505 |
| 5,589,544 | A | | 12/1996 | Horrion |
| 5,936,039 | A | * | 8/1999 | Wang et al. ................ 525/178 |
| 6,218,032 | B1 | | 4/2001 | Berta |
| 6,617,383 | B2 | * | 9/2003 | Ikawa et al. ................ 524/167 |
| 2005/0085591 | A1 | * | 4/2005 | Dozeman et al. ............ 525/192 |

FOREIGN PATENT DOCUMENTS

| EP | 361 205 | 10/1995 |
| EP | 976 783 | 2/2000 |
| EP | 844 278 | 5/2003 |
| WO | 96/01291 | 1/1996 |

* cited by examiner

*Primary Examiner*—Nathan M Nutter
(74) *Attorney, Agent, or Firm*—Nixon & Vanderhye P.C.

(57) ABSTRACT

Process for the preparation of a thermoplastic elastomer by melt mixing a partially vulcanized rubber concentrate, a thermoplastic polymer and/or additives, optionally oil and a curing agent. The partially vulcanized rubber concentrate is prepared by melt mixing at least one elastomer and optionally oil with a thermoplastic polymer and a curing agent. The elastomer may be EPDM or EPM. The thermoplastic polymer may be chosen from a thermoplastic polyolefin. Useful curing agents are for example sulfur, sulfurous compounds, metal oxides, maleimides, phenol resins, siloxanes or peroxides.

17 Claims, No Drawings

PROCESS FOR THE PREPARATION OF A THERMOPLASTIC ELASTOMER COMPRISING A PARTIALLY VULCANIZED RUBBER CONCENTRATE

CROSS REFERENCE TO RELATED APPLICATION

This application is the National Phase of International Application PCT/NL03/00057 filed Jan. 28, 2003 which designated the U.S., and was published in English, and which further claims benefit of priority to U.S. application Ser. No. 10/058,058, filed Jan. 29, 2002.

The invention relates to a process for the preparation of a thermoplastic elastomer.

A process for the preparation of thermoplastic elastomers is for example known from "Compounding of rubber Concentrate Thermoplastic Vulcanizates" by Terry M. Finerman, Ph.D., Luc Vandendriessche, Joseph E. Pfeiffer, presented at the Society of Plastics Engineers Topical Conference TPEs 2000, Sep. 28-29, 1999. Described is the preparation of fully vulcanized rubber concentrates and of thermoplastic elastomers by melt mixing the fully vulcanized rubber concentrates with ingredients such as oil, filler, stabilizers, processing aids and thermoplastic polymers for example polypropylene or polyethylene. The thus obtained thermoplastic elastomers have the disadvantage that their mechanical properties are not sufficient for some applications for example in automotive, building and construction, mechanical rubber goods or consumer products. For example the tensile strength value of those thermoplastic elastomers is relatively low and therefore not meeting the required automotive material specifications. Another disadvantage of the above process is that the preparation of fully cured rubber concentrates with consistent properties and good morphology is difficult because of the high concentration of elastomeric phase and the minor concentration of thermoplastic phase.

The object of the present invention is to completely or largely eliminate the stated drawbacks.

This object is achieved in that the thermoplastic elastomer is prepared by melt mixing:
a. a partially vulcanized rubber concentrate
b. a thermoplastic polymer and/or additives
c. a curing agent
d. and optionally oil.

Surprisingly the process of the present invention provides the preparation of thermoplastic elastomers with improved mechanical properties which meet the stringent material specifications needed for some applications in automotive, building and construction, mechanical rubber goods or consumer products. A further advantage is that the elastic properties of the thermoplastic elastomer are improved. Moreover the thermoplastic elastomers show an improved fluid resistance. Yet another advantage is that thermoplastic elastomers may be prepared with a better compression set.

The partially vulcanized rubber concentrate (a) is prepared by melt mixing:
e. at least one elastomer
f. at least one thermoplastic polymer
g. a curing agent and
h. optionally oil.

The elastomer(s) (e), the thermoplastic polymer(s) (f) and optionally oil (h) are melt mixed and kneaded above the melting point of the thermoplastic polymer (f) whereby the elastomer (e) is vulcanized during mixing and kneading. This process is also known as a dynamic vulcanization process.

The elastomer (e) may be any elastomer capable of being vulcanized by the curing agent. Examples of suitable elastomer(s) are ethylene-propylene copolymers, hereinafter called EPM, ethylene-propylene-diene terpolymers, hereinafter called EPDM, acrylonitrile-butadiene rubber, styrene-butadiene rubber, isobutene-isoprene rubber, styrene-ethylene/styrene-butadiene block copolymers, butyl rubber, isobutylene-p-methylstyrene copolymers or brominated isobutylene-p-methylstyrene copolymers or natural rubber. Also mixtures of elastomers may be used. Preferably, the elastomer in the partially vulcanized rubber concentrate according to the invention is an olefinic elastomer. It is especially preferred to use EPM or EPDM as elastomer. More preferably, EPDM is used as elastomer. The EPDM preferably contains 50-70 parts by weight ethylene monomer units, 48-30 parts by weight alpha-olefin monomer units and 1-12 parts by weight monomer units originating from a non-conjugated diene or combinations of more than one non-conjugated diene, the total sum in parts by weight of these components being 100. Preferably the alpha-olefin is propylene. As non-conjugated diene preferably use is made of dicyclopentadiene (DCPD), 5-ethylidene-2-norbornene (ENB), hexadiene or vinyinorbornene (VNB). The elastomer(s) may be prepared for example with a Ziegler-Natta catalyst, a metallocene catalyst or a single site catalyst.

Examples of suitable thermoplastic polymers (f) which may be used in the preparation of the partially vulcanized rubber concentrates are thermoplastic polyolefin homo- and copolymers or blends thereof. For example homopolymers of ethylene or propylene, copolymers of ethylene and propylene, copolymers of ethylene and an alpha-olefin comonomer with 4-20 carbon atoms or copolymers of propylene and an alpha-olefin comonomer with 4-20 carbon atoms. In case of a copolymer, the content of propylene in said copolymer is preferably at least 75% by weight. The thermoplastic polyolefin homo- and copolymers may be prepared with a Ziegler-Natta catalyst, a metallocene catalyst or with another single site catalyst. Also suitable thermoplastic polymers are for example reactor thermoplastic polyolefine elastomers (TPO's), polyamides, polycarbonate, polyesters, polysulfones, polylactones, polyacetals, acrylonitrile-butadiene-styrene (ABS) resins, polyphenylene oxide (PPO), polyphenylene sulfide (PPS), styrene-acrylonitrile (SAN) resins, polyimides, styrene maleic anhydride (SMA) and aromatic polyketones. It is possible to use more than one thermoplastic polymer in the preparation of the partially vulcanized rubber concentrates.

Preferably, a polypropylene homopolymer is used as thermoplastic polymer. The polypropylene may be atactic, isotactic, syndiotactic or a physical and chemical mixture thereof. The term chemical mixture means that the polypropylene may have atactic, isotactic or syndiotactic structures randomly or in blocks along the molecular chains. The polypropylene homopolymer may be linear or branched. The melt mass-flow rate (MFR) of the polypropylene preferably is between 0.3 and 50 g/10 min; more preferably below 20 g/10 min (according to ISO norm 1133 (230° C.; 2.16 kg load)).

Examples of suitable curing agents (g) include sulfur, sulfurous compounds, metal oxides, maleimides, phenol resins and peroxides. Also mixtures of curing agents may be used. Said curing agents are for example described in U.S. Pat. No. 5,100,947. It is also possible to use siloxane compounds as curing agent, for example hydrosilane or vinylalkoxysilane. The elastomer is preferably vulcanized with a phenol resin, a siloxane or a peroxide. Optionally, accelerators, catalysts, or activators may be added to enhance the vulcanization process. Examples of suitable accelerators are sulphur, ethylene dimethylacrylate, polyethylene glycol dimethylacrylate, trimethylol propane trimethacrylate, divinyl benzene, diallyl itaconate, triallyl cyanurate, diallylphtalate, allyl methacrylate, cyclohexyl methacrylate, m-phenylene bismaleimide and mixtures of any of them.

The amount of curing agent, the accelerator, the temperature and the time of vulcanization are selected in order to obtain the desired degree of vulcanization. Preferably the amount of curing agent is between 0,1-10 parts by weight per 100 parts by weight of elastomer. More preferably the amount of curing agent is between 0,1-5 parts by weight per 100 parts by weight of elastomer.

The degree of vulcanization of the elastomer can be expressed in terms of gel content or conversely, extractable components. The gel content is the ratio of the amount of non-soluble elastomer and the total amount of elastomer (in weight) of a specimen soaked in an organic solvent for the elastomer. The method is described in U.S. Pat. Nos. 4,311,628 and 5,100,947. In general terms a specimen is soaked for 48 hours in an organic solvent at temperatures suitable for the thermoplastic polymer and the elastomer. The solvent should be capable of dissolving the thermoplastic polymers completely at the temperature of gel test. After weighing both the specimen before soaking and the dried residue of the soaked specimen, the amount of non-soluble elastomer and total elastomer are calculated, based on knowledge of the relative amounts of all components in the composition.

The elastomer in the rubber concentrate is partially vulcanized. Partially vulcanized means that the elastomer may be vulcanized to a relatively low degree as long as there is no problem with pellet stickiness. Preferably, the elastomer in the partially vulcanized rubber concentrate has a gel content higher than 50%. More preferably a gel content higher than 70%.

Optionally oil (h) may be added. Any known oil may be used, examples of oils are processing oils for example paraffinic, naphthenic or aromatic oil or isoparaffinic oil which is also known as polyaltaolefinic oil. Preferably a highly hydrogenated oil obtained by a hydrocracking and isodewaxing process is used, for example PennzUltra, 1199, supplied by Pennzoil in the United States of America. The point in time at which the oil (h) is added may be before, during or after the dynamic vulcanisation of the elastomer. It is also possible that the oil is added partly before and partly during and/or after the dynamic vulcanisation of the elastomer. It is also possible that the elastomer has been pre-mixed with the desired quantity of oil or a proportion thereof, for example by using oil-extended elastomer. When the oil, or a proportion thereof, is pre-mixed with the elastomer, not all of the elastomer used has to be pre-mixed with oil. The elastomer (e) may be pre-mixed with between 0-250 parts by weight of oil per 100 parts by weight of elastomer. Preferably the amount of oil is higher than 10 parts by weight of oil per 100 parts by weight of elastomer. More preferably between 20-200 parts by weight of oil per 100 parts by weight of elastomer, and even more preferably between 30-160 parts by weight of oil per 100 parts by weight of elastomer. Most preferably the amount of oil is lower than 125 parts by weight of oil per 100 parts by weight of elastomer. A person skilled in the art may adjust the ratio of elastomer(s)/thermoplastic polymer(s)/oil to achieve partially vulcanized rubber concentrates with a lower or higher hardness. The partially vulcanized rubber concentrate for example has a hardness of 70 shore A or lower measured according to ASTM D-2240. Preferably the hardness is 60 shore A or lower. Most preferably the hardness is 50 shore A or lower.

The partially vulcanized rubber concentrate is preferably prepared by melt mixing between 30-95 parts by weight of the elastomer(s), between 0-60 parts by weight of oil, between 5-50 parts by weight of the thermoplastic polymer(s), between 0,1-10 parts by weight of the curing agent per 100 parts by weight of elastomer, whereby the sum of the parts by weight of the elastomer(s), thermoplastic polymer(s), curing agent and oil is 100. More preferably the amount of elastomer(s) varies between 35-90 parts by weight, the amount of oil varies between 5-55 parts by weight, the amount of curing agent varies between 0,1-5 parts by weight per 100 parts by weight of elastomer and the amount of thermoplastic polymer(s) varies between 5-40 parts by weight, whereby the sum of the parts by weight of the elastomer(s), thermoplastic polymer(s), curing agent and oil is 100. Most preferably the amount of elastomer(s) varies between 40-85 parts by weight, the amount of oil varies between 10-50 parts by weight, the amount of curing agent is between 0,1-5 parts by weight per 100 parts by weight of elastomer and the amount of thermoplastic polymer(s) varies between 5-30 parts by weight, whereby the sum of the parts by weight of the elastomer(s), thermoplastic polymer(s), curing agent and oil is 100.

The process for the preparation of the thermoplastic elastomer according to present invention comprises melt mixing
a. the partially vulcanized rubber concentrate
b. a thermoplastic polymer and/or additives
c. a curing agent and
d. optionally oil.

The melt mixing may be carried out in conventional mixing equipment for example roll mills, Banbury mixers, Brabender mixers, continuous mixers for example a single screw extruder, a Buss kneader, Ferro continuous mixer (FCM) and a twin screw extruder. Preferably melt mixing is carried out in a twin screw extruder with sufficient mixing efficiency, good temperature control and residence time control. By the use of a twin-screw extruder good tensile properties may be achieved. Furthermore, a good extrusion surface quality may be achieved using a twin-screw extruder. By the use of a single screw extruder better compression set values may be achieved. The use of a single or twin screw extruder depends on the desired properties of the thermoplastic elastomer.

The partially vulcanized rubber concentrate, the thermoplastic polymer and/or the additives, the oil and the curing agent may be dry blended prior to the melt mixing. Alternatively, the partially vulcanized rubber concentrate, the thermoplastic polymer and/or the additives, the oil and the curing agent may be directly fed to the mixing equipment. Generally, batch mixers are fed directly, whilst continuous mixers are fed by feeders and/or pumps at the feed throat and/or other parts or zones of the mixers.

Examples of the thermoplastic polymers (b) which may be melt mixed with the partially vulcanized rubber concentrate (a) are chosen from the above described thermoplastic polymers (f). The used thermoplastic polymer (b) does not necessarily have to be the same as the used thermoplastic polymer (f). The choice of the thermoplastic polymer in terms of melt mass-flow rate (MFR) or viscosity depends on the end applications. A person skilled in the art may select the thermoplastic polymer with proper molecular weight, molecular weight distribution or molecular structure to achieve the thermoplastic elastomer with balanced properties.

Examples of the suitable curing agents (c) are described above as the curing agents (g). The used curing agent (d) does not necessarily have to be the same as the used curing agent (g). The curing agent (c) may be in powder form, in liquid form or may be soluble in a liquid. If the curing agent is in powder form the partially vulcanized rubber concentrate pellets may first be coated with a processing oil and then blended with the curing agent powder prior to melt mixing with the thermoplastic polymers. Alternatively, the curing agent may be fed directly to the mixer, or mixed with filler and/or the usual additive(s) before being fed to the mixer. If the curing agent is in liquid form, it may be dry mixed with the partially vulcanized rubber concentrate prior to melt mixing with the thermoplastic polymer and/or the additives. If the curing agent is soluble in a liquid for example in processing oil or a solvent it may first be dissolved in the liquid and then coated onto the rubber concentrate pellets prior to melt mixing with the thermoplastic polymers. Alternatively, liquid curing agent, curing agent solution in oil or solvent, or curing agent melt can be dosed or injected directly to the mixer in the form of a liquid or liquid solution.

As oil (d), any known oil may be used. Examples of oils (d) which may be used in the process of the present invention are mentioned at the above described optional oil (h). The used oil (d) does not necessarily have to be the same as the optionally used oil (h). The point in time at which the oil (d) is added may be before, during or after the dynamic vulcanisation of the thermoplastic elastomer. It is also possible that the oil is added partly before and partly during and/or after the dynamic vulcanisation of the thermoplastic elastomer.

As stated above, the usual additives may be added. Examples of suitable additives which may be melt mixed are reinforcing and non-reinforcing fillers, plasticizers, antioxidants, stabilizers, processing oil, antistatic agents, foaming agents, pigments, flame retardants, tackyfiers, low friction coefficient additives for example silicon oil and fatty amide lubricants and viscosity modifiers, for example waxes and other known agents described in for example the Rubber World Magazine Blue Book. Examples of suitable fillers are calcium carbonate, clay, silica, talc, titanium dioxide, carbon and mixtures of any of them. Another additive that may optionally be used in the thermoplastic elastomer is a Lewis base for example a metal oxide, a metal hydroxide, a metal carbonate or hydrotalcite. The quantity of additive to be added is known to one skilled in the art.

In the process of the present invention it is also possible to prepare the thermoplastic elastomer by melt mixing the partially vulcanized rubber concentrate, additives and curing agent without the thermoplastic polymer (b). The amount of additives is for example between 0,5-15 parts by weight relative to the total quantity of the thermoplastic elastomer. Preferably the amount of additives is between 1-10 parts by weight relative to the total quantity of thermoplastic elastomer. More preferably the amount of additives is between 2-8 parts by weight relative to the total quantity of the thermoplastic elastomer.

The gel content of the thermoplastic elastomer according to the present invention may vary between 60 and 100%. Preferably, the gel content is in excess of 80%. More preferably, the gel content is in excess of 90%. Most preferably the gel content is in excess of 97%.

The process of the present invention comprises the preparation of the thermoplastic elastomer by melt mixing for example:

a. 10-90 parts by weight of the partially vulcanized rubber concentrate
b. 90-10 parts by weight of the thermoplastic polymer and/or additives
c. 0,1-10 parts by weight of the curing agent
d. 0-30 parts by weight of oil whereby the sum of the parts by weight of the partially vulcanized rubber concentrate, the thermoplastic polymer and/or additives, the oil and the curing agent is 100.

Preferably the thermoplastic elastomer is prepared by melt mixing a. 15-70 parts by weight of the partially vulcanized rubber concentrate
b. 85-30 parts by weight of the thermoplastic polymer and/or additives
c. 0,1-5 parts by weight of the curing agent
d. 0-30 parts by weight of oil whereby the sum of the parts by weight of the partially vulcanized rubber concentrate, the thermoplastic polymer and/or additives, the oil and the curing agent is 100.

The process of the present invention may be carried out in two stages. In a first stage, the partially vulcanized rubber concentrate may be prepared whereby at least one elastomer is partially vulcanized in the presence of at least one thermoplastic polymer using appropriate curing agents. In a second stage the partially vulcanized rubber concentrate, the appropriate thermoplastic polymer and/or additives are melt-mixed in the presence of the curing agent to initiate a further dynamic vulcanization. The curing agents used in the first and in the second stage may be the same or different curing agents. Preferably the same curing agent is used in the two stages.

The two stages can be carried out independently in separate steps or sequentially in the same processing equipment. After dynamic vulcanization the thermoplastic elastomer may be pelletized. The thermoplastic elastomer may however also be directly fed in molten stage to next processing equipment for example through a die. In such case the continuous mixer may be attached with the die or other necessary downstream equipment and acts not only as mixer but at the same time as a melting and a conveying equipment for processes as for example foaming, film and sheet extrusion, profile extrusion, film and sheet calendering or co-extrusion. The additives may be added during the preparation of the partially vulcanized rubber concentrate or during the preparation of the thermoplastic elastomer or both.

The thermoplastic elastomer prepared by the process according to the present invention may be used in automotive, building and construction, mechanical rubber goods or consumer products.

The present invention will be further explained by the following examples without being limited thereto. The measurements in the examples were carried out using the following tests:

Hardness ASTM D-2240, 5 sec delay
Specific gravity, ASTM D792
Tensile strength, ASTM D-412, Die C
Ultimate Elongation, ASTM D-412, Die C
100% modulus, ASTM D-412, Die C
Tear strength, ASTM D-624, Die C
Compression set, 22 hrs@ 70° C. % ASTM D-395, method B
Compression set, 70 hrs@ 125° C. % ASTM D-395, Method B
Oil swell, 70 hrs@ 125° C., ASTM D-471
Color of pellets, CIE L*, a*, b* system, Illuminant/Observer D65/10° Instrument geometry 45°/0°
Apparent shear viscosity, ASTM D3835, at 200° C. and 207 $s^{-1}$ apparent shear rate, Die L/D=30

EXAMPLE 1

A partially vulcanized rubber concentrate (compound 1) was prepared in a 92 mm Werner&Pfleiderer intermeshing co-rotating twin-screw extruder by melt mixing and kneading 67,1 parts by weight Keltan P597™ (50 wt % oil-extended EPDM) with 7,7 parts by weight polypropylene homopolymer PP 1012™ (BP Amoco, MFR=1.2 g/10 min) as thermoplastic polymer, 25,2 parts by weight of Sunpar 150C™ (Sunoco Inc.) processing oil, 0,3 wt % phenolic resin SP1045™ (Schenectady Int. Inc.) and 0,3 wt % stannous chloride dihydrate activator (Goldschmidt). The properties of compound 1 are shown in table 1.

TABLE 1

| Properties | Test value |
| --- | --- |
| Hardness, Shore A | 41 |
| Tensile strength, Mpa | 3.1 |
| Elongation % | 424 |
| 100% Modulus, Mpa | 1.0 |
| Tear Strength, kN/m | 11.6 |
| Compression set, 22 hrs @ 70 C., % | 25.0 |
| Compression set, 70 hrs @ 125 C., % | 35.5 |
| Oil swell in IRM 903, 70 hrs @ 125 C., % | 125 |

Comparative Experiment A

A thermoplastic elastomer (compound A) was prepared of compound 1 pellets and a polypropylene homopolymer 31S07A (Equistar, MFR=0,7 g/10 min) without the addition of phenolic resin SP1045™ as curing agent. Compound A was prepared on a 25 mm Berstorff intermeshing co-rotating twin screw extruder.

EXAMPLE 2

A thermoplastic elastomer (compound 2) was prepared of compound 1 pellets and a polypropylene homopolymer 31S07A (MFR=0,7 g/10 min) with the addition of phenolic resin SP1045™ as curing agent.

To prepare compound 2, the compound 1 pellets were first coated with a small amount of processing oil Sunpar 150C™ and then blended with SP1045™ powder in a cement mixer before the polypropylene homopolymer 31S07a was introduced. All ingredients were further dry blended using a cement mixer prior to the melt mixing.

Compound 2 was prepared on a on a 25 mm Berstorff intermeshing co-rotating twin screw extruder.

EXAMPLE 3

A thermoplastic elastomer (compound 3) was prepared according to example 3 except that a 1.5 inch Killion single screw extruder with l/d ratio of 24/1 was used.

After melt mixing, melt strands were cooled in a cold water bath before being pelletized. All compounds were dried for at least three hours at 82° C. to remove any residual moisture prior to injection molding. 4×4 cm corner gated plaques with a thickness of 3 mm were used for testing the mechanical properties. The results are shown in table 2

TABLE 2

| | Compound A Parts by weight | Compound 2 Parts by weight | Compound 3 Parts by weight |
| --- | --- | --- | --- |
| compound 1 | 58.6 | 58.0 | 58.0 |
| PP homopolymer 31S07A | 41.4 | 41.2 | 41.2 |
| Sunpar 150 C ™ | | 0.2 | 0.2 |
| phenolic resin SP1045 ™ | | 0.6 | 0.6 |
| Hardness Shore D | 39.4 | 41.0 | 39.1 |
| Tensile strength, MPa | 14.8 | 18.2 | 13.3 |
| Ultimate Elongation, % | 728 | 580 | 493 |
| 100% modulus, MPa | 8.8 | 9.8 | 8.6 |
| Tear strength, kN/m | 73.3 | 73.6 | 67.0 |
| Compression set, 22 hrs @ 70 C., % | 57.5 | 52.3 | 45.3 |
| Compression set, 22 hrs @ 125 C., % | 76.7 | 69.1 | 68.0 |
| Oil swell in IRM 903, 70 hrs @ 125 C., % | 44.4 | 32.0 | 36.7 |

Table 2 shows that the thermoplastic elastomers prepared by the process of the present invention have good mechanical properties. Moreover it is clear that the use of a twin-screw extruder leads to better mechanical properties whereas the use of a single screw extruder leads to better compression set values. In addition, the use of the curing agent in the preparation of compounds 2 and 3 shows improved fluid resistance as indicated by the lower oil swell values in comparison to the control compound A.

Comparative Experiment B

A thermoplastic elastomer (compound B) was prepared of compound 1 pellets and a polypropylene homopolymer 31S07A without the addition of phenolic resin SP1045™ as curing agent. Compound B was prepared on a 40 mm Berstorff intermeshing co-rotating twin screw extruder with both compound 1 pellets and polypropylene 31S07A fed to the feed throat using two independent feeders. An underwater pelletizer was used to pelletize the compound.

EXAMPLE 4

A thermoplastic elastomer (compound 4) was prepared of compound 1 pellets and a polypropylene homopolymer 31S07A with the addition of mixture of phenolic resin SP1045™ powder and small amount of talc on a 40 mm Berstorff intermeshing co-rotating twin screw extruder.

To prepare compound 4, phenolic resin SP1045™ powder was first mixed with talc Cimpact 610 (Luzenac America) using a Maxaco high speed mixer. Adding talc to SP1045™ powder improves the flow properties of the mixture and increases distributive and dispersive mixing of the curative with other ingredients added to the twin screw extruder. Such mixture or additive package and compound 1 pellets were dosed to the feed throat of the twin screw extruder using two independent feeders while the polypropylene homopolymer 31S07A was dosed through the side feeder to the middle of the extruder. An underwater pelletizer was used to pelletize the compound.

EXAMPLE 5

A thermoplastic elastomer (compound 5) was prepared according to example 4 except that the polypropylene homopolymer 31S07A was dosed to the feed throat. Three independent feeders were used in this case. An underwater pelletizer was used to pelletize the compound.

The ratio of compound 1 to the polypropylene homopolymer was kept about the same for compounds B, 4 and 5. After melt mixing and pelletizing, these compounds were dried for at least three hours at 82° C. to remove any residual moisture prior to injection molding. 4×6 cm fan gated plaques with a thickness of 2 mm were used for testing the mechanical properties. The results are shown in table 3

TABLE 3

|  | Compound B Parts by weight | Compound 4 Parts by weight | Compound 5 Parts by weight |
| --- | --- | --- | --- |
| compound 1 | 84.7 | 82.1 | 82.1 |
| PP homopolymer 31S07A | 15.3 | 14.8 | 14.8 |
| phenolic resin SP1045 ™ |  | 0.6 | 0.6 |
| Talc Cimpact 610 |  | 2.5 | 2.5 |
| Hardness Shore A | 76.8 | 77.2 | 78.3 |
| Specific gravity | 0.92 | 0.94 | 0.94 |
| Tensile strength, MPa | 8.1 | 9.0 | 10.2 |
| Ultimate Elongation, % | 642 | 528 | 541 |
| 100% modulus, MPa | 3.1 | 3.3 | 3.4 |
| Tear strength, kN/m | 33.7 | 31.4 | 31.2 |
| Compression set, 22 hrs @ 70 C., % | 39.7 | 33.1 | 33.6 |
| Compression set, 22 hrs @ 125 C., % | 58.7 | 52.4 | 52.0 |
| Oil swell in IRM 903, 70 hrs @ 125 C., % | 86.7 | 65.1 | 62.9 |
| Color of pellets, L* | 77.0 | 76.0 | 73.9 |
| Color of pellets, a* | −0.3 | −1.2 | 0.5 |
| Color of pellets, b* | 13.6 | 20.1 | 19.3 |
| Apparent shear viscosity, Pa · s | 257 | 285 | 269 |

Table 3 shows that the thermoplastic elastomers (compounds 4 and 5) prepared by the process of the present invention have higher tensile strength, better elastic properties as indicated by the lower compression set values, and better oil resistance compared to the control compound B. Moreover, it is clear that the addition of polypropylene to the side feeder (compound 4) resulted in lighter and less pinkish color than that of feeding polypropylene to the feed throat (compound 5) as indicated by the higher L* value and lower a* value. In addition, the use of talc in compounds 4 and 5 resulted in slightly higher specific gravity. The viscosity was also increased slightly for compounds 4 and 5 compared to the control compound B.

The invention claimed is:

1. Process for the preparation of a thermoplastic elastomer comprising the steps of:
    (a) performing a first dynamic vulcanization stage by melt-mixing a1) at least one elastomer, a2) a first thermoplastic polymer, and a3) a first curing agent under dynamic vulcanization conditions to form a partially vulcanized rubber concentrate, and thereafter
    (b) performing a second dynamic vulcanization stage by melt-mixing (b1) the partially vulcanized rubber concentrate formed according to step (a) with an added amount of (b2) a second thermoplastic polymer and (b3) a second curing agent under dynamic vulcanization conditions to form the thermoplastic elastomer, wherein the first curing agent a3) and the second curing agent b3) are each independently selected from the group consisting of phenolic resins, siloxane compounds, peroxides, sulfur, sulfurous compounds and mixtures thereof.

2. Process according to claim 1, wherein the first and second vulcanization stages (a) and (b), respectively, are practiced independently of one another.

3. Process according to claim 1, wherein the first and second vulcanization stages (a) and (b), respectively, are practiced sequentially in the same processing equipment.

4. Process according to claim 1, wherein the first dynamic vulcanization stage (a) to form the partially vulcanized rubber concentrate comprises melt-mixing:
    (i) 30 to 95 parts by weight of the at least one elastomer;
    (ii) 5 to 50 parts by weight of the first thermoplastic polymer;
    (iii) 0.1-10 parts by weight of the first curing agent; and
    (iv) optionally oil, wherein
    the sum of the parts by weight of components (i)-(iv) is 100.

5. Process according to claim 1, wherein the at least one elastomer is EPDM or EPM.

6. Process according to claim 1, wherein each of the first and second thermoplastic polymers, which may be the same or different, is at least one thermoplastic polymer selected from the group consisting of thermoplastic polyolefin homo- and copolymers, reactor TPO, polyamides, polycarbonate, polyesters, polysulfones, polylactones, polyacetals, acrylonitrile-butadiene styrene (ABS) resins, polyphenylene oxide (PPO), polyphenylene sulfide (PPS), styrene-acrylonitrile (SAN) resins, polyimides, styrene maleic anhydride (SMA) and aromatic polyketones.

7. Process according to claim 1, wherein each of the first and second thermoplastic polymers, which may be the same or different, is a thermoplastic polyolefin homopolymer or a thermoplastic polyolefin copolymer.

8. Process according to claim 1, wherein each of the first and second thermoplastic polymers is a polypropylene homopolymer.

9. Process according to claim 1, wherein the elastomer in the partially vulcanized rubber concentrate has a gel content higher than 50%.

10. Process according to claim 1, wherein the elastomer in the partially vulcanized rubber concentrate has a gel content higher than 70%.

11. Process for the preparation of a thermoplastic elastomer according to claim 1, wherein the second dynamic vulcanization stage (b) is practiced by melt mixing:
    (1) 10-90 parts by weight of the partially vulcanized rubber concentrate;
    (2) 90-10 parts by weight of the second thermoplastic polymer;
    (3) 0.1-10 parts by weight of the second curing agent, and
    (4) optionally oil and/or additives, wherein
    the sum of the parts by weight of components (1)-(4) is 100.

12. Process according to claim 1, wherein each of the first and second curing agents is the same curing agent selected form the group consisting of phenolic resins, siloxanes, peroxides and mixtures thereof.

13. Process according to claim 1, further comprising melt mixing oil when conducting at least one of the first and second dynamic vulcanization according to steps (a) and (b), respectively.

14. Process according to claim 1, further comprising melt mixing additives when conducting at least one of the first and second dynamic vulcanization according to steps (a) and (b), respectively.

15. Process according to claim 1, wherein the first curing agent a3) and the second curing agent b3) are each independently selected from the group consisting of phenolic resins, siloxanes, peroxides and mixtures thereof.

16. Process according to claim 6, wherein each of the first and second thermoplastic polymers is the same.

17. Process according to claim 16, wherein each of the first and second thermoplastic polymers is a polypropylene homopolymer.

* * * * *